United States Patent [19]
Kiriyama et al.

[11] 4,231,017
[45] Oct. 28, 1980

[54] SWITCHING MATRIX EQUIPMENT HAVING A SERIES CIRCUIT OF RELAY COIL AND SELF-HOLDING DIODE AT EACH CROSSPOINT

[75] Inventors: Toshikatsu Kiriyama, Fujisawa; Yoshiro Hasegawa, Kamakura, both of Japan

[73] Assignee: Hitachi, Ltd., Japan

[21] Appl. No.: 13,832

[22] Filed: Feb. 22, 1979

[30] Foreign Application Priority Data

Feb. 22, 1978 [JP] Japan .................................. 53-18456

[51] Int. Cl.³ .............................................. H04Q 9/00
[52] U.S. Cl. ............................. 340/166 R; 179/18 GE
[58] Field of Search ................... 340/166 R, 166 S; 179/18 GE; 361/166

[56] References Cited

U.S. PATENT DOCUMENTS 3,349,186  10/1967  Bereznak ........................ 179/18 GF
3,532,976  10/1970  Adelaar et al. .................. 340/166 R

OTHER PUBLICATIONS

Philips Telecommunication Review, vol. 27, No. 3, May 1968, pp. 105–112.
Electrical Communication, vol. 42, No. 1, 1967, pp. 33–39.
Ericsson Review, No. 2, 1976, pp. 75–81.

*Primary Examiner*—Donald J. Yusko
*Attorney, Agent, or Firm*—Craig & Antonelli

[57] ABSTRACT

A switching matrix equipment is disclosed for use in a telecommunication switching system. Each crosspoint comprises a series circuit of a relay coil and a self-holding diode. First and second switch groups cooperate to select a crosspoint and to fire a self-holding diode of the cross point. After the self-holding diode is fired, the crosspoint related is held or sustained by means of a third switch group with a lower voltage than the threshold voltage of the self-holding diode.

6 Claims, 4 Drawing Figures

SWITCHING MATRIX EQUIPMENT HAVING A SERIES CIRCUIT OF RELAY COIL AND SELF-HOLDING DIODE AT EACH CROSSPOINT

BACKGROUND OF THE INVENTION

1. Field of the Invention

This invention relates to a switching matrix in a network of a telephone switching system. More particularly, this invention relates to an improvement on a switching matrix equipment with relay coils at crosspoints in which designation of a desired crosspoint in the switching matrix selectively energizes the relay coil of a relay related to the designated crosspoint to close a speech path of the switching network through the closed contacts of the relay.

2. Description of the Prior Art

In a switching network of a telephone switching system, a desired speech path in the network is formed by closing the contacts of the relay associated with the speech path. Generally, such a switching network uses a matrix with a number of crosspoints each comprising a relay coil for closing the related relay contacts. Specifying a proper row and a proper column selects and energizes the relay coil correspondingly associated with a desired speech path. In the switching matrix using relays at the crosspoints, the desired relay having been selected and energized is held with a small current restricted by a resistor used or the like, with a view of the reduction of power consumption produced by the current flowing through the relay coil. In this case, since it is necessary to make the current flow only through the relay coil selected, a relay contact, which is closed by energization of the relay coil related is used in series with the coil, for the purpose of setting up an electrical path permitting the holding current to flow therethrough. The switching matrix with such a construction, however, is disadvantageous in some points. For example, at the moment that the contact connected in series with the relay coil, which is one of the contacts of the selected and energized relay, is closed, a holding power source for holding the relay is applied to the contact, in addition to a drive power source for driving the relay. Thus, an excessive current flows through the contact, leading to wear of the contact. In the case of the reed relay using a reed switch, welding between the reed tips becomes problematic. The reed relay case suffers from another disadvantage that such a contact as to hold the relay is necessary in addition to the contact to close the speech path and thus when an expensive reed switch is used, the switching matrix using such is costly.

In case where switching matrices arranged in multi-stage connection, when crosspoint switches at the respective stages are held in their operations, it is necessary to successively select and hold the relay coils at the stages correspondingly related to the crosspoint switches. In a system of the type in which the relay coil is held through the associated relay contact, the succeeding relay coil cannot be driven until the preceding relay contact is closed. Therefore, a relatively long time must be taken until all the relay coils are selected and held.

There has been used another example to selectively hold the relay coils, in which three-terminal diodes are used in place of the relay contacts. This example is free from the problems of the relay contact wear or the reed tip welding. The example, however, needs lead wires for gate current supply to the gate terminal of the diode. Accordingly, a power source to supply the gate current is required and superfluous and troublesome work is necessary for connecting the lead wires to the gate terminal of the diode. A general switching equipment employs a multistage connection of switching matrices. Such a switching equipment of the gate control type rejects the multistage connection of the relays to close the crosspoint switches in those matrices so that selection, holding and release of a desired relay must be made for each stage.

SUMMARY OF THE INVENTION

Accordingly, a primary object of the invention is to provide a switching matrix equipment with high reliability and free from the problems of the relay contact wear and the reed tip welding.

Another object of the invention is to provide a switching matrix equipment of small-sized and economical type.

Still another object of the invention is to provide a switching matrix equipment which is easy to control when switching matrices are connected in multi-stage fashion.

To achieve those objects, there is provided a switching matrix equipment comprising: a group of relays in which a number of series connections each including a relay coil connecting at one end to one end of a self-holding diode with a threshold level, are arranged in matrix fashion and the other ends of the relay coils are connected to the corresponding lead wires arrayed in row (or column) and the other ends of the self-holding diodes are coupled to the corresponding lead wires arrayed in column (or row); a first switch group coupled with the corresponding row lead wires of the relay group; a second switch group coupled with the corresponding column lead wires of the relay group; a third switch group connected through resistors to the corresponding row or column lead wires of the relay group; means which closes a single switch in each of the first and second switch groups to select a desired relay coil of the relay group and applies a voltage exceeding the threshold level of voltage of the self-holding diode connected in series with the relay coil to the self-holding diode thereby to fire in the same way; and means for holding at a voltage applied below the threshold level the relay coil selected through one of the switches in the third switch group and the self-holding diode.

DETAILED DESCRIPTION OF THE PREFERRED EMBODIMENTS

Figure 1:
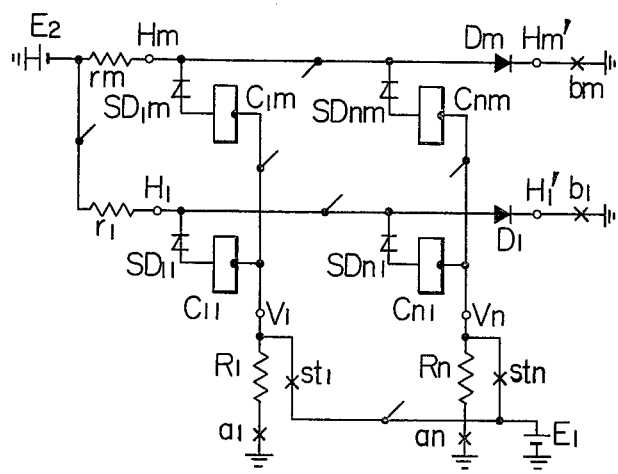
FIG. 1 shows a schematic diagram of an embodiment of a switching matrix equipment according to the present invention, in which a group of relays arranged in n×m matrix fashion are subjected to a two-dimensional selection.

Referring now to FIG. 1, there is shown a switching matrix equipment which is an embodiment according to the invention. In FIG. 1, series connections each including relay coils C11 to Cnm connecting at one end to the anode of self-holding diodes SD11 to SDnm are disposed at the crosspoints which are the intersections of lead wires connected to vertical terminals V1 to Vn and lead wires connected to horizontal control terminals H1' to Hm' and to horizontal terminals H1 to Hm. The self-holding diodes SD11 to SDnm may each be a two-terminal, four-layer diode of PNPN type which is conductive in response to a voltage applied thereto with a higher voltage level than the threshold voltage level of the diode and, after it is conducted, its conduction is sustained at a minute voltage applied. Ordinary PN type diodes D1 to Dm each intervene between the cathode of each of self-holding diodes SD11 to SDnm and each of horizontal control terminals H1' to Hm'. Impedance elements, e.g., resistors r1 to rm intervene between a negative holding power source E2 and the horizontal terminals H1 to Hm. And, a1 to an represent holding contacts for supplying ground through resistors R1 to Rn to vertical terminals H1' to Hm'; b1 to bm selection contacts for supplying ground to the horizontal control terminals H1' to Hm'; st1 to stn drive contacts for a positive power source E1 to the vertical terminals V1 to Vn. Those contacts are made up of the relay contacts of relays operable under control of a marker, for example. With such a construction, the voltage level $|E1|$ of the positive drive power source E1, the voltage level $|E2|$ of the negative holding power source E2 and the threshold voltage level $|Eth|$ of each of the self-holding diodes SD11 to SD1m are selected in the following relation:

$$|E2| < |Eth| < |E1|$$

For example, E1 is +30 V, E2 is −12 V and Eth is +24 V.

The operation of the switching matrix equipment shown in FIG. 1 will be given below. In the figure, for selectively holding the relay coil C1m, the selection contact bm and the holding contact a1 are previously closed, respectively. Under this condition, because of $|E2| < |Eth|$, the self-holding diode SD1m is in cut-off condition and the diode Dm also is in cut-off condition because an inverse voltage is applied by the negative power source E2. Therefore, no current flows at this time. Then, the drive contact st1 is closed so that a voltage exceeding the threshold voltage Eth is applied between the power source E1 and the diode SDm. As a result, the self-holding diode SD1m is fired to permit current to flow through a route of E1-st1-V1-C1m-SD1m-Dm-Hm'-bm-ground, with the result that only the relay coil C1m is selected and magnetically excited through the contacts st1 and bm. Then, opening selection contact bm permits current to flow through a route of E1-st1-V1-C1m-SD1m-Hm-rm-E2-ground. Following this, opening the drive contact st1 directs the current flow to the holding contact a1 side so that a route of a1-R1-V1-C1m-SD1m-Hm-rm-E2-ground selects the relay coil C1m through holding resistors R1 and rm, resulting in holding only the contact C1m through a single holding contact a1. At this time, power developed in the coil C1m is reduced by the resistors R1 and rm and therefore the holding power is also reduced. That is, a little amount of holding power suffices for the relay holding. Then, one coil C1m is selected and held and two contacts of the relay including the coil C1m close A and B lines (not shown) of the corresponding speech path. The coil C1m is released by opening the holding contact a1 since the opening of the contact renders the self-holding diode SD1m nonconductive. In this manner, any coil may be selected, held and released.

Figure 2:
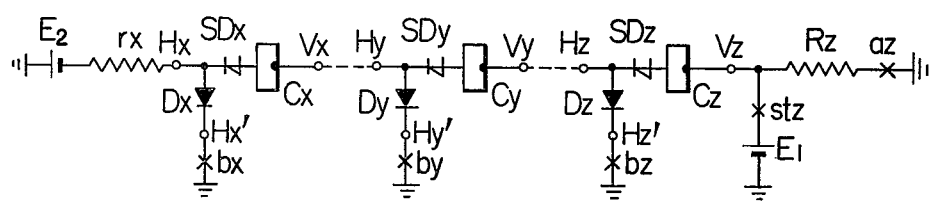
FIG. 2 shows a schematic diagram of a switching matrix equipment in which three stages of the switching matrices shown in FIG. 1 are used and one crosspoint of each stage switching matrix is selected and held.

Turning now to FIG. 2, there is shown an example having three stages of switching matrices shown in FIG. 1. A switching network in a telephone switching system generally comprises three to five stages of switches to close speech paths. Closing a switch of each stage sets up a path connecting the incoming side of the switching network to the outgoing side. Further, the relay coils of the switching matrix at each stage are also connected in multistage fashion and the relay coils at the respective stages are successively selected and held. The connection shown in FIG. 2 effects such an operation with such a connection. In FIG. 2, Cx, Cy and Cz are each representative of a crosspoint in each of first to third stage switching matrices. SDx designates a self-holding diode at the first stage switching matrix; Dx a PN diode at the first stage; Hx a horizontal terminal at the first stage; Vx a vertical terminal at the first stage; Hx' a horizontal control terminal at the first stage; bx a selection contact at the first stage. The same thing is true for the second and third stages. The crosspoints Cx, Cy and Cz at the first and third stages are coupled in a manner, for example, that the vertical terminal Vx at the first stage is connected to the horizontal terminal at the second stage and the vertical terminal Vy at the second stage to the horizontal terminal Hy at the third stage. The operation of the switching matrix equipment shown in FIG. 2 will be described. In order to selectively operate the relay coils Cx, Cy and Cz, the contacts bx, by, bz and az corresponding to those crosspoints are previously closed. Under this condition, the drive contacts stz corresponding to the third stage coil Cz are closed. The voltage by the power source E1 activates a route including the contacts stz and bz thereby to fire the diode SDz and to magnetically excite the relay coil Cz. Then, the contact bz is opened so that a route including stz and bz fires the diode SDz thereby to magnetically excite a coil Cy. Further, when the contact by is opened, the diode SDx is fired and the coil Cx is magnetically excited. In this manner, the coils Cx, Cy and Cz are successively selected and excited. Upon the excitation of those coils, the contact bx opens and then the contact bx opens so that the same route through the holding contact az, and resistors Rz and rx sustains a series connection of the respective stage coils Cx, Cy and Cz between ground and the holding power source E2. The respective stage coils Cx, Cy and Cz are released by opening the holding contact az since the opening of the contact az renders the diodes SDx, SDy and SDz nonconductive. When the coils Cx, Cy and Cz at the respective stages are in holding condition through the contact az, if the selection contact by, for example, is erroneously closed, ground is supplied to the terminal Hy' so that the coils Cy and Cz at the post stages, which are in holding condition, may be released erroneously. Provision of the diodes Dx, Dy and Dz as shown, however, prevents the crosspoints from being supplied with ground, even if the contacts bx, by or bz are erroneously closed, thus eliminating the erroneous release of the coils in holding condition.

Figure 3:
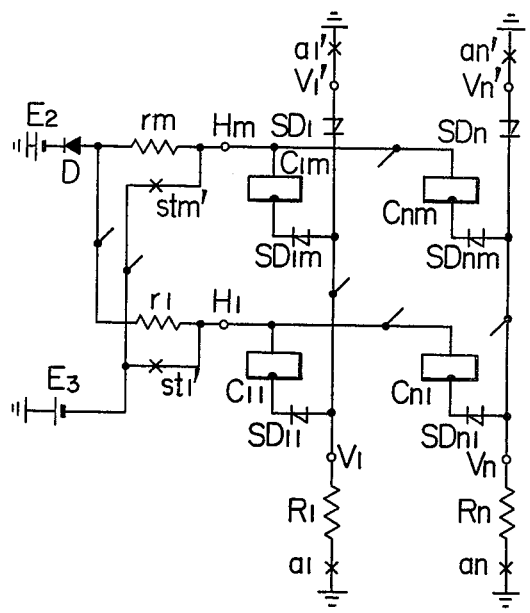
FIG. 3 shows a schematic diagram of another embodiment of the switching matrix equipment according to the invention.

Reference is made to FIG. 3 illustrating another embodiment of the switching matrix equipment according to the invention.

In FIG. 3, series connections each including relay coils C11 to Cnm connecting at one end to the cathode of a self-holding diodes SD11 to SDnm are disposed at the crosspoints which are the intersections of lead wires connected to vertical terminals V1 to Vn and lead wires connected to horizontal terminals H1 to Hm. Vertical control terminals V1' to Vn' are connected to the anodes of the self-holding diodes SD11 to SDnm, through additionally provided self-holding diodes SD1 to SDn, respectively. The vertical control terminals V1' to Vn' are supplied with ground through selection contacts a1' to an'. The horizontal terminals H1 to Hm are supplied with a negative drive power source E3, through the drive contacts st1' to stm', respectively. The diode D provided at the negative holding power source E3 is provided to prevent current leaking from the power source E1 into the switching matrix equipment. The remaining symbols designate like portions in FIG. 1. With such a construction, the negative power source E3 must make two self-holding diodes conductive, for example, SD1m and SD1. For this reason, the voltage level |E3| of the negative power source E3 is selected in the following relation with respect to the threshold voltage level |Eth| of the self-holding diode:

$$|E3| > 2|Eth|$$

Figure 4:
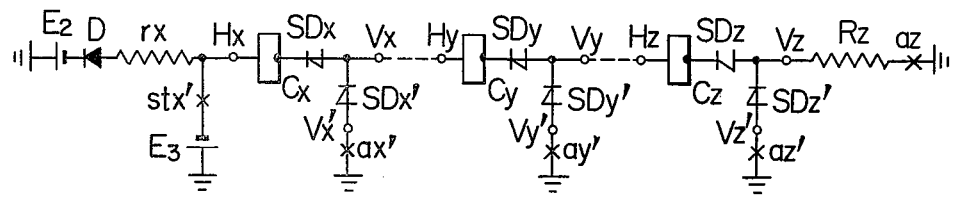
FIG. 4 shows a schematic diagram of a switching matrix equipment in which three stages of the switching matrices shown in FIG. 3 are used.

The operation of the circuit shown in FIG. 3 is as follows. In FIG. 3, in order to selectively hold the relay coil C1m, the holding contact a1 and the selection contact a1' are previously closed. Under this condition, the self-holding diode SD1m remains nonconductive because of |E2| < |Eth|. Then, when the drive contact stm' is closed, applied between the power source E3 and gorund is a voltage exceeding 2Eth which is the sum of the threshold voltages of the self-holding diode SD1m and SD1. Therefore, those diodes SD1m and SD1 are fired so that current flows through a route of a1'-V1'-SD1-SD1m-C1m-Hm-stm'-E3-ground and only the coil C1m is selected through the contacts a1' and stm' and is magnetically excited. Upon the opening of the contact a1', the current flow is directed toward the contact a1 side so that current flows through a route of a1-R1-V1-SD1m-C1m-Hm-stm'-E3-ground. In this manner, current flows into the coil C1m through the holding resistor R1. Then, opening of the contact stm' forms a route of a1-R1-V1-SD1m-C1m-Hm-rm-D-E2-ground. Accordingly, current flows through the resistors R1 and rm and therefore the coil C1m is selected and held with a small amount of power. Also in this case, the coil C1m is released by opening the holding contact a1 since the opening of it makes the diode SD1m nonconductive. The explanation to follow is the reason why the self-holding diodes SD1 to SDn are provided at the vertical control terminals V1' to Vn' side in FIG. 3. FIG. 4 shows a circuit diagram of a switching matrix equipment having three stages of the switching matrices shown in FIG. 3. In the figure, characters x, y and z indicate the switching matrices at first to third stages, respectively. An outstanding difference of the FIG. 4 circuit operation from the FIG. 2 circuit operation is that, when the relay coils Cx, Cy and Cz at the respective stages are selectively and magnetically excited, the first stage relay coil Cx is first excited, the second stage relay coil is then excited and the third stage relay coil is finally excited. The operation of the circuit shown in FIG. 4 will be described.

Firstly, the selection contacts ax', ay' and az' and the holding contact az corresponding to the respective stage crosspoints are previously closed. Under this condition, when the drive contact stx' corresponding to the first stage coil Cx is closed, the drive power source E3 is applied through a route including the contacts ax' and stx'. Upon the application of the voltage, the diodes SDx and SDx' are fired and the coil Cx is selected and magnetically excited. Then, the contact ax' is opened so that a route including the contacts ay' and stx' fires the diodes SDy and SDy' and the coil Cy is selectively and magnetically excited. At this time, the diode SDx' becomes nonconductive. Succeedingly, the opening of the contact ay' fires the diodes SDz and SDz' thereby to selectively and magnetically excite the coil Cz. Then, the contact az' opens and the contact stx' opens so that a route including the holding contact az, the resistors Rz and Rx sustains a series connection of the coils Cx, Cy and Cz at the respective stages between ground and the holding current power source E2. The coils Cx, Cy and Cz are released by opening the holding contact az since its opening renders the diodes SDx, SDy and SDz nonconductive. The following is the reason why the self-holding diodes SDx' and SDy' are provided between the vertical control terminals Vx', Vy' and Vz' and the corresponding crosspoints. When the coils Cx, Cy and Cz are held in series connection through the contact az, if gorund is erroneously supplied to the vertical control terminal at a certain stage (for example, if the contact ax' shown in FIG. 4 is erroneously closed, ground is supplied to the terminal Vx'), ground is supplied to the crosspoint if an ordinary type diode is used for the diode SDx'. As a result, the coils Cy and Cz at the post-stages, which are in holding condition, are erroneously released. On the other hand, if a two-terminal, PNPN four-layer, self-holding diode with a threshold voltage level is used for each diode SDx, SDy and SDz (SD1 to SDn in FIG. 3), no ground is supplied to the crosspoints even when the contacts ax', ay' and az' (a1' to an' in FIG. 3). Therefore, the coils at the respective stages, which are being held, is never released.

As described above, the use of a series connection including a relay coil and a self-holding diode at each crosspoint eliminates the need for holding the relay through the relay contact which is magnetically operable. This solves some problems attendant on closing contact, such as the contact wear, and the contact welding. Accordingly, the reliability of the equipment is remarkably improved. Further, the invention eliminates the need for using expensive reed contact of reed switches or the like. Accordingly, the switching matrix equipment obtained is small and compact in size. Additionally, the operation speed of the equipment is very high, thus resulting in a considerable reduction of the control time. Thus, the equipment of the invention can control mechanical contacts at electronic speed. A further advantage of the equipment according to the invention requires no gate control since the self-holding diode used in the invention effects the control operation with two terminals. Therefore, the assembling work of the equipment is simplified with no need of a power source for supplying gate current and the lead wire for the gate terminal. The multistage connection of the switching matrix equipment permitted in the invention enables a single holding contact to hold the relay coils at the respective stages in series connection and to simultaneously release them.

The selection, drive and holding switches used in the above-mentioned embodiments are the contacts of the relay; however, these contacts may of course be replaced by semiconductor switches such as transistors and thyristors. When those semiconductor switches are used, diodes for preventing erroneous operation, connected to the control terminal, may be unnecessary. It should be understood that the circuit construction using various control switches, the power source, relays, etc., is not limited to those described and shown but many other changes and modifications are permitted within the scope of the invention.

We claim:

1. A switching matrix equipment comprising:
   (a) a relay matrix having series circuits each including at least one relay coil connecting at one end to one end of a self-holding diode with a threshold level and each disposed at each crosspoint;
   (b) a first means with first and second switch groups for designating a row and a column of said relay matrix, in which a crosspoint of said relay matrix is selected by closing a single switch of each of said first and second switch groups and a voltage exceeding the threshold voltage level of the self-holding diode at the selected crosspoint is applied to the diode thereby to fire the same diode;
   (c) a second means with a third switch group for holding the crosspoint selected of said relay matrix, in which the self-holding diode at the crosspoint selected by said first means is fired and then the crosspoint selected is held at a voltage below the threshold voltage level which is applied through a switch of said third switch group correspondingly related to the crosspoint selected.

2. A switching matrix equipment according to claim 1, in which said first means includes a voltage supply source for supplying to said first switch group a voltage exceeding the threshold voltage level of the self-holding diode at the selected crosspoint, and control diodes provided between said second switch group and said relay matrix.

3. A switching matrix equipment according to claim 1, in which said first means includes self-holding diodes for control with a threshold voltage level which are provided between said first switch group and said relay matrix, and a voltage supply source for supplying to said second switch group a voltage exceeding the sum of the threshold voltage levels of the self-holding diode at the selected crosspoint and the self-holding diode for control.

4. A switching matrix equipment according to claim 1, in which said second means includes a voltage supply source for supplying to said relay matrix a voltage below the threshold voltage level of the self-holding diode at the crosspoint, through an impedance element, said voltage supply source being connected through said relay matrix to said third switch group.

5. A switching matrix equipment according to claim 1, in which the self-holding diode at each crosspoint of said relay matrix is a two-terminal, PNPN fourlayer diode.

6. A switching matrix equipment according to claim 1, in which said relay matrices are arranged in multistage fashion in a manner that each crosspoint at the respective stages of said relay matrices is connected in series, each crosspoint at the respective stages serially connected is selected by said first means and the self-holding diodes at the crosspoints selected are sequentially fired and then the crosspoints at the respective stages are serially and commonly held by said second means through a route serially connecting the respective single crosspoints at the respective stages.

* * * * *